Jan. 27, 1959

F. MORETTI 2,870,911

SCRAPER BLADE DEVICE

Filed Aug. 17, 1956

INVENTOR.
FRANCESCO MORETTI
BY
*Attys.*

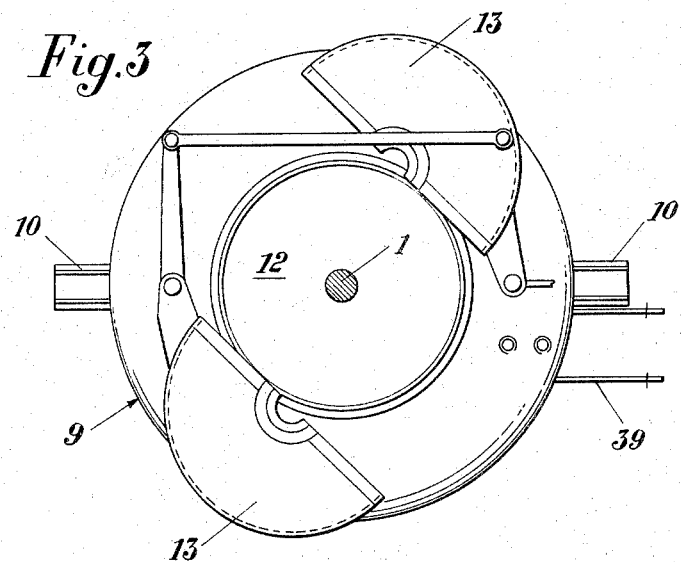
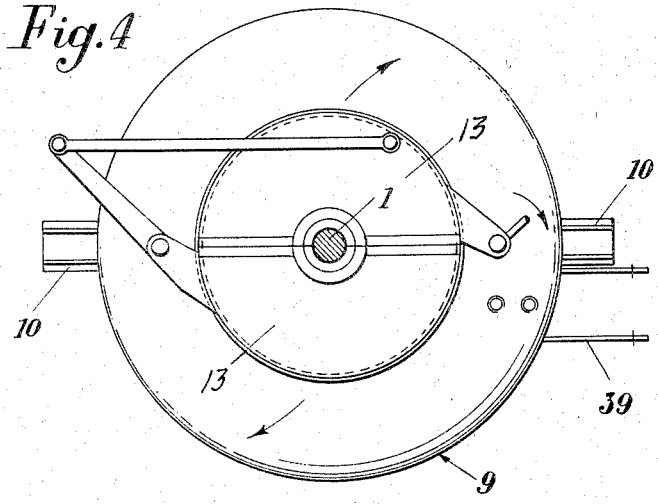

Jan. 27, 1959

F. MORETTI 2,870,911

SCRAPER BLADE DEVICE

Filed Aug. 17, 1956

INVENTOR.
FRANCESCO MORETTI

Jan. 27, 1959  F. MORETTI  2,870,911
SCRAPER BLADE DEVICE
Filed Aug. 17, 1956  5 Sheets-Sheet 4
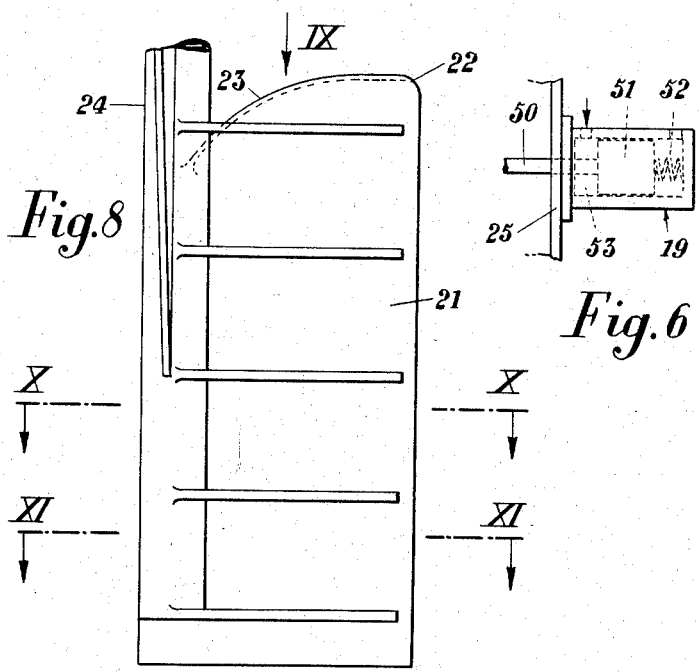
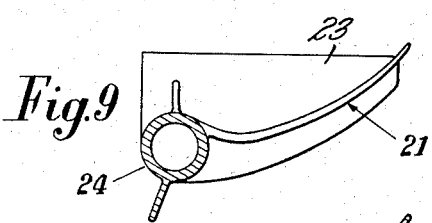
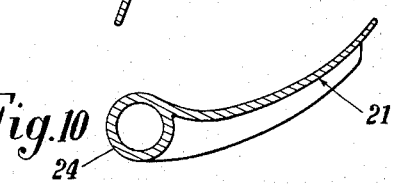
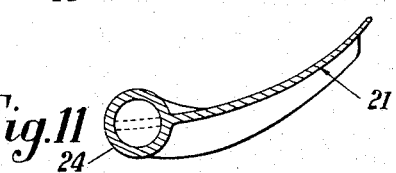
INVENTOR.
FRANCESCO MORETTI
BY
*ATTYS.*

Jan. 27, 1959 F. MORETTI 2,870,911
SCRAPER BLADE DEVICE
Filed Aug. 17, 1956 5 Sheets-Sheet 5

INVENTOR.
FRANCESCO MORETTI
BY
Wenderoth, Lind & Ponack
ATTYS.

United States Patent Office 2,870,911
Patented Jan. 27, 1959

2,870,911
SCRAPER BLADE DEVICE

Francesco Moretti, Terni, Italy, assignor to Officine Meccaniche e Fonderie A. Bosco S. p. A. Terni, Italy, a company of Italy Application August 17, 1956, Serial No. 604,666

Claims priority, application Italy October 19, 1955

6 Claims. (Cl. 210—147)

The present invention relates to an intermittently operated, mechanically controlled scraper blade device, operable both to scape and to unload a container having the shape of a revolution solid.

Said scaper blade, although particularly designed for unloading oscillating centrifugal hydroextractors, which are commonly used in sugar manufacture, can be successfully applied in any case where a circular cross-sectional container, revolving about its axis is to be emptied or unloaded.

The main object of this invention is to provide a scraper blade device which moves through a single swinging movement in a plane parallel to the rotational axis of the hydroextractor, so as to be able to move at will from a non-operative position outside the hydroextractor, to a plurality of operative positions inside the rotary basket of the machine. These positions, determined by the progress of the blade into the centrifuged material, cause the latter to be unloaded by scraping said material in subsequent layers, and simultaneously directing said material to outlets provided in the bottom of rotary basket. Another object of this invention is that of providing said scraping member with pneumatic fluid control means which causes the scraping member to pass from one to another of its positions only when the operative conditions of the hydroextractor are such as to allow the scraping member to be operative.

A further object of this invention is to provide the control device for the movements of the scraping member with several safety means suitable to ensure the proper operation of the unit, for instance either in case of failure of the operative fluid for the control system for the scraping member movements, or in case the basket to be emptied gets out of alignment.

A still further object of this invention is to provide an actuating unit for the scraping member with damping means, slowing down the final step of the lowering movements of the scraper during its insertion into the basket at the start of the operative step of scraping the material collected in the basket.

The above and other objects and features of this invention will be clearly set forth or will be apparent from the following detailed specification of a preferred embodiment of this invention, taken in connection with the accompanying drawings, wherein:

Figs. 3 and 4 are plan views on a slightly enlarged scale, of the centrifuge cover, in its closed and opened positions, respectively;

Figure 5:
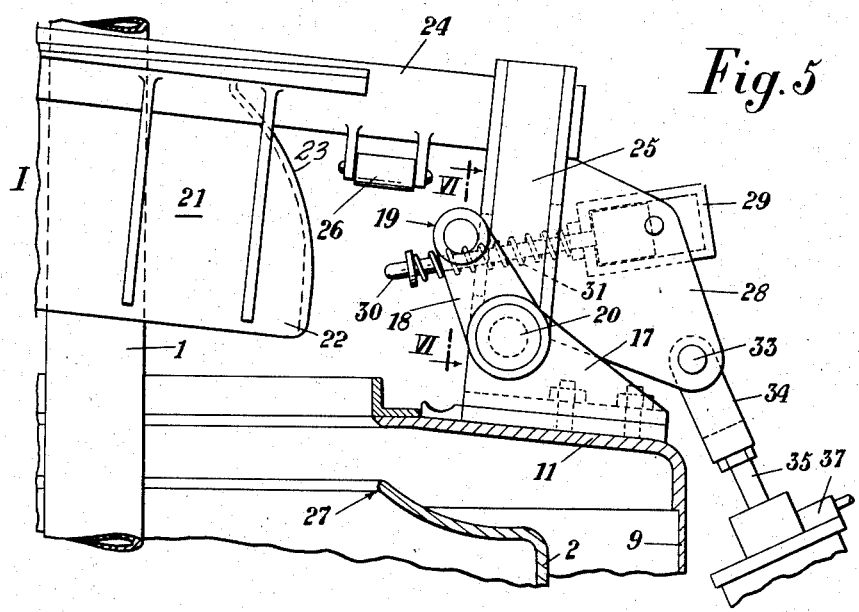
Fig. 5 is a fragmentary side elevation with some parts in cross section, of the safety and actuating devices for the scraping member, in its extracted position.
Figure 7:
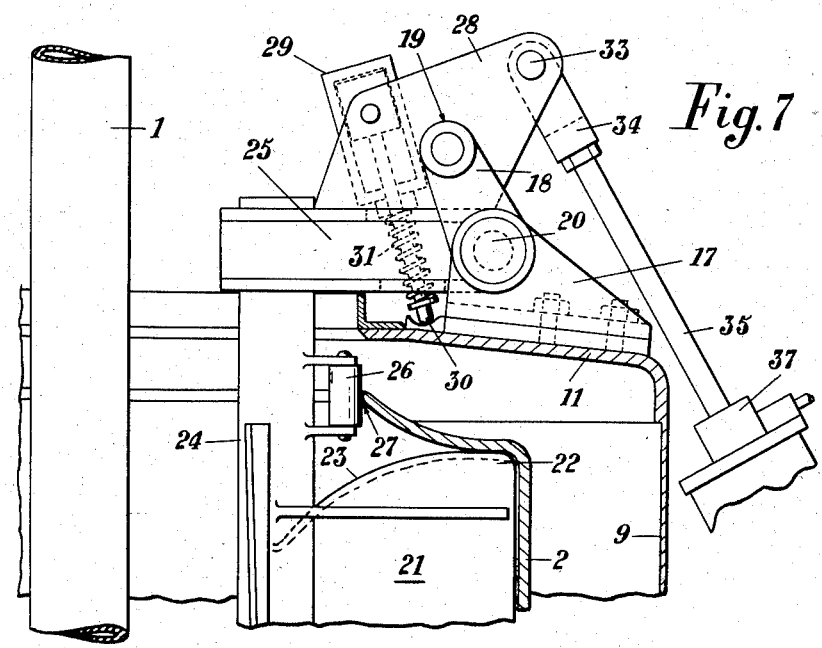
Figure 12:
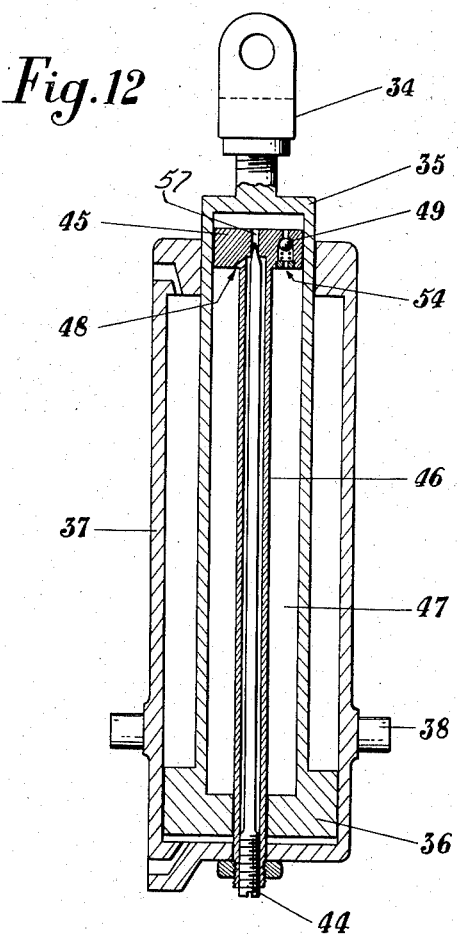

Fig. 6 a diagrammatical cross-sectional detail view of Fig. 5, taken along the line VI—VI of Fig. 5;

Fig. 7 is a view similar to that of Fig. 5, with the scraping member in the final position of operation;

Fig. 8 is a detail side elevational view of the scraping device, alone;

Fig. 9 is a top view of the scraping member in the direction of the arrow IX of Fig. 8;

Figs. 10 and 11 show cross-sectional views of Fig. 8 taken along the lines X—X and XI—XI of said figure, respectively, and Fig. 12 is an alternative embodiment of a damping device inserted in the fluid operated control cylinder.

With reference to the drawings, where the same reference numerals denote the same parts in the different figures, it will be noted that the device is shown in its form as applied to a cylindrical oscillating basket of a centrifugal hydroextractor. The hydroextractor comprises a shaft 1 hung at its upper end. On the lower end of said shaft 1 is mounted a basket 2 having a bottom 3 with a mounting hub 4 and provided with the openings 5 for the exhaustion of the centrifuged matter 6. Also, the basket comprises a cylindrical vertical housing 7 and an upper lid 8 contoured with a radius having its center at the pivot 20 whereon the unloading scraping blade is pivoted, so as to allow for the passage of said scraping blade during its movement into and out of the basket. The rotary basket 2 is contained within the protective casing 9 which is fixed to the hydroextractor frame by brackets 10.

A circular opening 12, concentric with the shaft 1 is provided in the lid 11 of the casing 9, in order to allow the loading of the material to be centrifuged. Said opening 12 is provided with a two part lid 13 (Figs. 3 and 4) which opens during the loading and unloading operations and closes during the centrifugation.

The bottom of the casing is provided with a cone shaped outlet 15 for unloading the centrifuged material 6. The opening 15 has a two-part cover 16 of the same type as the upper lid 13 which also closes during the centrifugation and the loading step, and opens during the exhaustion of the centrifuged material.

Figure 1:
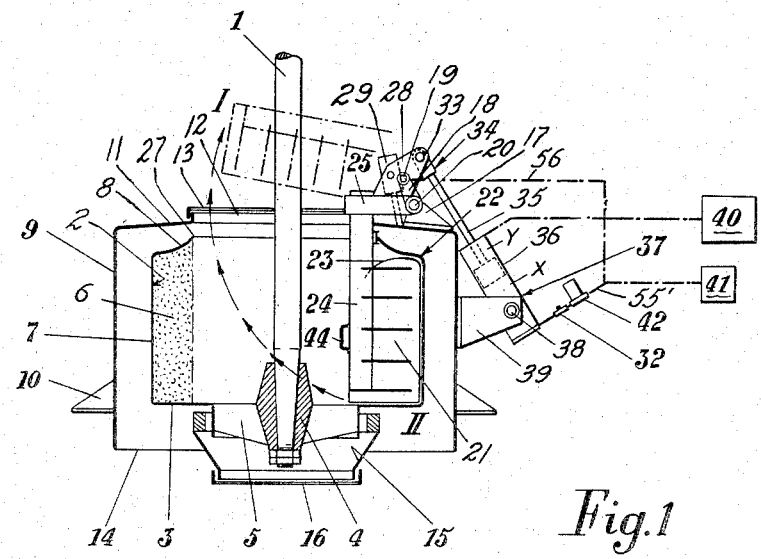
Fig. 1 is a partially cross-sectional, diagrammatical elevation of the scraping device as applied to the hydroextractor.
Figure 2:
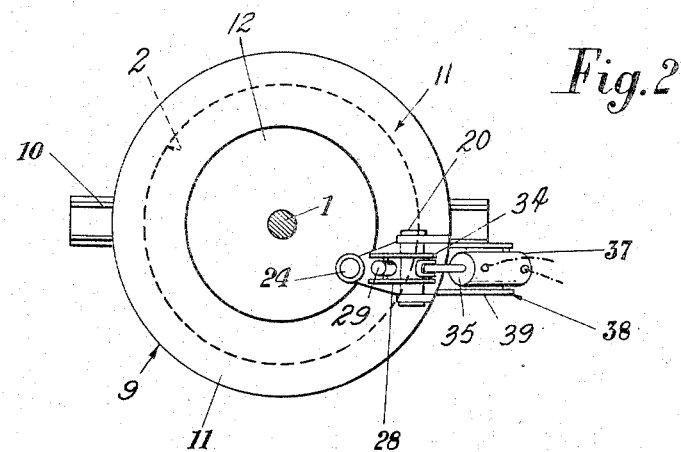
Fig. 2 is a top plan view of the unit of Fig. 1, with some parts removed for sake of clarity.

The scraping device is a blade 21 shaped as shown in Figures 8 to 11 so as to direct the centrifuged material 6 into the exhaust opening 5 in the bottom of the basket. The blade 21, during the centrifugation and loading operations is located outside the basket and the casing at the position I of Figure 1, shown in detail in Figure 5. The blade reaches its operative location shown at II in Figure 1 and illustrated in detail in Fig. 7 inside the basket, moving along an arc shaped path having its center at the pivot 20.

Pivot 20 is fastened by the support 17 to the casing 9. In the preferred embodiment herein disclosed, the movement is controlled by a pneumatic cylinder 37 (Figures 1, 5 and 7) operated for example by compressed air. Of course, instead of being pneumatic, the cylinder can be of any other type, and the fluid can be a non-pneumatic fluid, and generally any other type of control can be adopted without departing from the scope of this invention. As will be disclosed later, various control and safety devices permit the scraping blade to enter the basket only at a safe speed, lower than 200 R. P. M.

On the upper stationary lid 11 of the casing 9 (Figs. 5 and 7) there is mounted a support 17 for the scraper, said support having an extension 18 to which a safety cylinder 19 is secured.

The scraper, which is pivotally mounted on the pivot 20 fixed to the support 17, comprises a blade 21 (Figures 8 to 11) so shaped as to direct the centrifuged material 6 towards the outlets 5 of the bottom of the basket. Blade 21 is provided at the upper edge with a baffle 23 (Figs. 8 and 9) to assist the removal of the centrifuged material toward the outlets when blade 21 starts scraping at the upper corner 22 as it enters the basket 2.

The rod 24 carrying the blade 21 of the scraper is connected to the pivot 20 by the connecting lug 25 (Figures 5 and 7). To the rod 24 is fixed the safety roller 26 positioned so as to be very close, when the scraper is lowered, to the upper edge 27 of the basket 2 (Fig. 5). In case the basket 2 gets out of alignment, said upper edge 27 bears against the roller 26 and moves said scraper so that the blade 21 can no longer contact the inner cylindrical wall of the rotary basket 2, thus preventing damage to filtering screens arranged on said wall.

To the connecting lug 25 of the scraper are fixed two ears 28 for supporting both the rod 35 of the control pneumatic cylinder 37 and an oil damper 29. Damper 29 comprises a plunger provided with a rod 30. The damper 29 contains oil which may pass from one side of the plunger to the other through an aperture, the cross sectional area of which is adjustable by a screw (not shown). Rod 30 is kept outward of damper 29 by a spring 31. Damper 29 follows the scraper through its rotational movement towards the inside of the basket. When the upper edge 22 of the blade 21 starts scraping the centrifuged material 6 contained within the basket 2, the rod 30 of the damper 29 bears against the stationary lid 11 of the casing 9 and due to this pressure the oil contained within the damper is forced to move through the adjustable aperture. By adjusting the passage area of said aperture by means of said screw, a desired unloading rate for the basket can be set, which rate will remain unaltered due to the incompressibility of the oil. When the scraper moves back to its outer inoperative position, shown at I in Fig. 1, the damper rod 30 is restored to its initial position by the return spring 31.

The speed of the scraper, in the first portion of its path, until the oil damper 29 starts operating, is controlled by a needle valve 32, diagrammatically shown in Fig. 1, controlling the flow of the pressurized air into the lower chamber X of the pneumatic cylinder 37. A connecting member 34 for the rod 35 of the control pneumatic cylinder 37 is connected to said mounting ears 28 (Fig. 5 and Fig. 7) for the damper 29, and is freely rotatable about its pivot 33. The pneumatic cylinder may swing about the pivot 38 mounted on the support 39 of the casing 9.

Due to the presence of the rod 35 inside the chamber Y the cylinder has differential features in that the upper chamber Y, controlling the extraction of the blade from the basket, is directly and at all times connected to a pressurized air reservoir 40. Also the lower chamber X controlling the introduction of the blade into the basket, is connected to the reservoir 40, but in exhausting phase is connected to the atmosphere. When this lower chamber X is in the exhaust phase, the blade, urged by the air pressure constantly prevailing in the upper chamber Y of the cylinder 37, moves out of the basket. On the contrary, when the lower chamber X is connected by means of line 55 to the pressurized air reservoir 40, the difference between the operative areas of the chambers X and Y, both under pressure, causes the scraping blade to be introduced into the basket. A three way valve 41 is provided to control the inlet of the air to chamber X and may be controlled either manually, or by a mechanical control device, or at a pre-established time by a program device. This arrangement will be described in detail.

In order to avoid a situation in which, due to a sudden lack of air, the scraping blade, no longer supported by the constant pressure of the pressurized air within the upper chamber Y of the control cylinder 37, enters the basket 2 when the latter rotates at a speed greater than the speed at which it is safe to empty the basket, which would entail a serious danger, a pressurized air actuated safety cylinder 19 is mounted on the extension 18 of the support 17. Said cylinder 19 (Figs. 5, 6 and 7), as shown in Figure 6, is a single action cylinder, and the return stroke of the piston is controlled by a spring 52. The chamber 53 of the cylinder 19 communicates with the air line 55 connecting the reservoir 40 to the lower chamber X of the pneumatic control cylinder 37 by means of line 56 (Fig. 1).

When the scraper is in the inoperative position I outside the casing, as shown in Fig. 5, and in dotted lines in Fig. 1, the chamber 53 of the safety cylinder 19, together with the air line 55 connecting the pressurized air reservoir 40 to the chamber X are exhausted. The spring 52 urges the rod 50 to move to a position under the connecting lug 25 of the scraper, so that even if the pressurized air is absent in the upper chamber Y of the cylinder 37, the scraper cannot enter the basket. On the contrary, when the three way valve 41 connects the reservoir 40 to the lower chamber X of the pneumatic cylinder 37, the pressure acts also in the chamber 53 of the cylinder 19, moving the piston 51 against the action of the spring 52, disengaging thus the rod 50 from the connecting lug 25 of the scraper so that the latter can move into the basket.

In case of lack of air within the reservoir 40, the scraper may be manually operated. The operator may manually disengage the safety cylinder 19 and then he can operate the scraper by the emergency handle 44 (Fig. 1) mounted on the rod 24.

The oil damper, which starts operating as soon as the blade begins scraping the material to be unloaded, keeps the scraping speed exactly equal to that obtained when the scraping blade is operated by the pressurized air.

As a further safety device, in the line 55 controlling the introduction of the scraping blade into the basket, there is inserted an electrically operated valve (not shown), connected to the electrical motor of the hydroextractor, said valve permitting the passage of the air only when the basket speed has been slowed down to the safe speed for unloading the basket.

Furthermore in order to prevent the operator from running the hydroextractor to its loading and centrifuging speed before the scraping blade has been returned to its inoperative position, an electrical contact (not shown) is provided which permits the basket to be rotated at high speed only when the scraper is outside the basket.

The movable lid 13 for the casing may be either manually or pneumatically controlled.

Figs. 3 and 4 clearly show the two part lid, and the linkage controlling the movements of said parts. If the lid is operated by a pneumatic cylinder, the control thereof is by a four way valve (not shown), actuated either manually or by a program device. In any case, when the basket is rotating at the centrifugation speed, the lid is closed thus ensuring that the scraping blade cannot be introduced when the basket is rotating at said speed.

Lastly, when the lower cover 16 of the casing is controlled by a pressurized air cylinder, since said cover is opened only for removing the centrifuged material, the safety cylinder 19 is connected to the pressurized air line controlling the opening of said lower closure. Thus, even if the operator actuates the scraping device by mistake, since the lower cover 16 is closed its control line, connected as aforesaid to the safety cylinder 19, is connected to the exhaust, no pressurized air acts on cylinder 19 and therefore the cylinder rod latches the scraping blade preventing the latter from entering the basket.

The preceding disclosure describes a damper cylinder which is separate from the actuating cylinder 37. Fig. 12 shows a different embodiment in which the oil damper may be incorporated into the cylinder 37. In this case the plunger 36, provided with a hollow rod 35, slides in said cylinder 37. The damper rod 46 is contained within the hollow rod 35, and is fixed to the cylinder 34; to said damper rod 46 there is fastened the adjusting pin 44. When the rod 35 moves, while the damper plunger 45 and the associated rod 46 are stationary (in that they are connected to the cylinder 37), a pressure builds up in the oil contained within the recess 47 and said oil tends to pass through the plunger 45 through the opening 48, as the greater opening 54 of greater diameter is closed by the ball valve 49, due to the pressure prevailing on the plunger 45. The passage of the oil produces the damping effect as the scraping blade starts scraping the centrifuged material. The volume of the oil contained within the recess 47 is less than the volume of said recess and the volume differential is the factor determining the delay of the start of operation of the damper. When the reverse movement occurs the ball valve 49 opens, allowing the oil to flow out at a speed which does not dampen the movement.

I claim:

1. A centrifugal hydroextractor for the production of sugar which comprises in combination an outer stationary casing having the bottom and the top wall each provided with a central aperture, a cover for each of the said apertures, each of said covers having two sectors arranged to be closed and open with respect to each other, a first support fastened outwardly of the upper wall of the casing, a second support fastened to the side wall of the casing, a shaft suspended for rotation above the said casing and extending into the said casing and rotating therein, a basket contained in the said casing and mounted on said shaft and rotating therewith, said basket having a bottom having outlets and the top wall having a central aperture corresponding to the central aperture of the top wall of said casing, said top wall of the basket having a convex surface curving toward the inside of said basket, a scraper comprising a rod, a blade and a connecting member perpendicular to the rod pivoted to the said first support on the casing, said scraper being swingable in a vertical plane parallel to the rotational axis of the hydroextractor from an inoperative position outside the casing to a plurality of operative positions inside the casing along an arc of a circle having a radius equal to the radius of curvature of the said convex surface of the top wall of the basket, said scraper having a side edge parallel to the said rod of the scraper and having an upper edge having a convex form defining with the said side edge a corner which when the scraper has reached the last of the said plurality of operative positions inside the basket, faces the side and top wall of the basket, a pneumatic control device pivoted at one end to the said second support on the side wall of the said casing and operatively connected to said rod of the scraper for controlling the swinging of said scraper, a safety device pivoted on the said first support on the upper wall of said casing and engaging said scraper for preventing the swinging of the said scraper except under certain conditions, an oil damper mounted between said scraper and said casing for controlling the downward swinging speed of said scraper during the passage of the scraper from the first to the last one of the said plurality of operative positions inside the basket, and a reservoir of compressed air connected to said pneumatic control cylinder and the said safety device for supplying compressed air thereto.

2. A centrifugal hydroextractor as claimed in claim 1 in which the blade of the said scraper has a baffle on the upper edge thereof and the rod of the scraper has a roller thereon rotatable about an axis parallel to the axis of said rod, said roller being mounted on said rod to contact the edge of said central aperture of the upper wall of the basket when said scraper has reached the last one of the plurality of operative positions inside the basket.

3. A centrifugal hydroextractor as claimed in claim 1 in which the pneumatic control device pivoted on the said second support on the side wall of the casing comprises a cylinder, a piston slidable in the cylinder, a piston rod on said piston projecting out of the cylinder and having the free end pivoted to said connecting member on the scraper, said piston dividing the cylinder into two chambers, and means for selectively placing each chamber in communication with the said reservoir of compressed air.

4. A centrifugal hydroextractor as claimed in claim 1 in which said oil damper comprises a cylinder pivoted on said connecting member of said scraper and movable with the scraper, a piston slidable in the said cylinder, a piston rod on said piston and projecting from the said cylinder, a spring mounted on the said piston rod and compressed between the outer free end of the said rod and the said cylinder, said free end of the piston rod contacting the upper wall of the said casing when the said scraper has reached the first of the said plurality of operative positions inside the said basket.

5. A centrifugal hydroextractor as claimed in claim 1 in which said safety device comprises a cylinder mounted on the said first support of the upper wall of the said casing, a piston slidable in the said cylinder, a piston rod on said piston and projecting into two chambers, the chamber of the said cylinder located on the side of the piston having the piston rod thereon being connected to said pneumatic control device to receive compressed air when the said pneumatic control device is actuated by compressed air to move the scraper into the basket, a spring between the said piston and the bottom of the cylinder urging said piston rod out of the cylinder, the free end of the said piston rod being in the path followed by the rod of the said scraper during the lowering thereof toward the operative positions inside the basket.

6. A centrifugal hydroextractor according to claim 1 in which said pneumatic control device contains the said oil damper and comprises a cylinder, a first piston slidable in the said cylinder, a first hollow piston rod on said piston and containing oil and projecting from the said cylinder, said first hollow piston rod having the free end pivoted on said connecting member of the scraper, said first piston dividing said cylinder into two chambers, means for selectively placing said chambers in communication with the said reservoir of compressed air, a second piston inside the said first hollow piston rod and having a central bore, a second hollow piston rod on said second piston, said second hollow piston rod being fastened to the bottom of the said cylinder, said first hollow piston rod being axially slidable with respect to the said second piston which remains stationary, an adjusting pin contained in the said second hollow piston rod and having one end adjustably connected to the said second hollow piston rod and having the other end cone shaped and adjustably extending into the said central bore of the said second piston, said hollow piston rod having a bore in the wall thereof close to the said second piston to form together with the central bore of the said second piston an oil passage from the one side to the other side of the said second piston, said second piston having an aperture therein having an area greater than the area of the central bore, a spring loaded ball valve in said aperture, said ball valve being arranged to permit passage of oil from the side of said second piston having the larger area to the side of the said second piston inside the said first hollow piston rod.

References Cited in the file of this patent

UNITED STATES PATENTS

| | | |
|---|---|---|
| 236,389 | Heston | Jan. 4, 1881 |
| 1,701,731 | Schautt | Feb. 12, 1929 |
| 1,909,188 | Roberts | May 16, 1933 |
| 2,037,655 | Roberts | Apr. 14, 1936 |
| 2,467,023 | Foster et al. | Apr. 12, 1949 |
| 2,667,974 | Hertrich | Feb. 2, 1954 |